Feb. 6, 1923.
A. C. MASON
1,444,625
DRILL PRESS SPINDLE MOUNTING
Filed Nov. 19, 1919
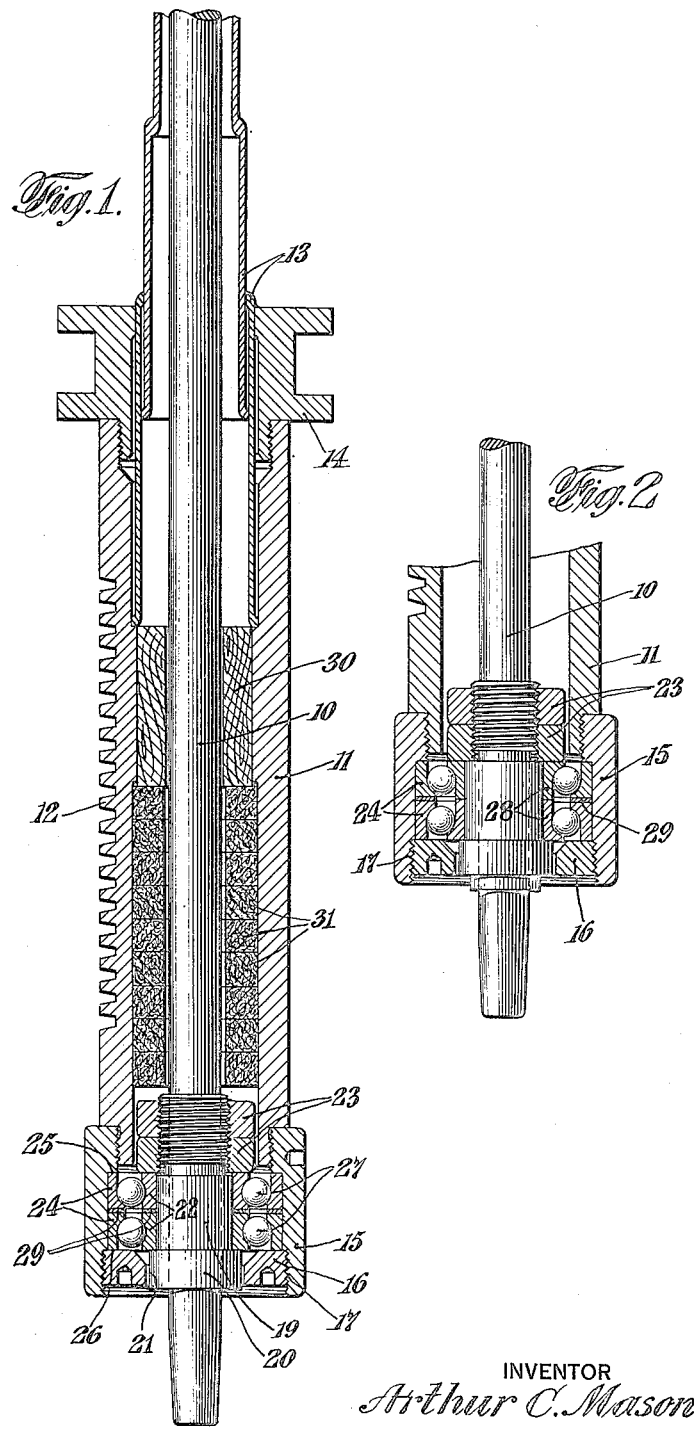
INVENTOR
Arthur C. Mason
BY
ATTORNEY Patented Feb. 6, 1923.

1,444,625

UNITED STATES PATENT OFFICE.

ARTHUR C. MASON, OF GLEN ROCK, NEW JERSEY, ASSIGNOR TO CHARLES A. WIDMER, OF GLEN ROCK, NEW JERSEY.

DRILL-PRESS SPINDLE MOUNTING.

Application filed November 19, 1919. Serial No. 339,214.

*To all whom it may concern:*

Be it known that I, ARTHUR C. MASON, a citizen of the United States, and a resident of Glen Rock, in the county of Bergen and State of New Jersey, have invented certain new and useful Improvements in Drill-Press Spindle Mountings, of which the following is a specification.

The invention relates to a mounting for spindles as employed in drill presses and like machinery, wherein a reciprocable spindle is designed to be rotated, usually at high velocity. It has for its object to provide a double ball bearing support for the spindle relatively to its carrying member or sleeve, the thrusts thereof acting in opposite directions, and an additional bearing being provided, preferably, to steady the spindle at high velocities. A further object of the invention consists in a construction of mounting which will permit of ready assembly, also one in which wear may be accommodated for and suitable lubrication provided.

The nature of the invention will be best understood when described in connection with the accompanying drawings, in which—

Fig. 1 is a longitudinal section of a portion of the drill spindle with surrounding sleeve, and a bearing member for retaining the former within the latter.

Fig. 2 is a fragmentary section illustrating a modification.

Similar characters of reference designate corresponding parts throughout the several views.

Referring to the drawings, 10 designates the tool end of the spindle which it is desired to rotatably mount within a suitable sleeve 11 in a manner to permit of reciprocation of the said spindle with the said sleeve. The latter may for this purpose be provided along one side with rack teeth 12, as is well understood, the invention, however, relating more particularly to the means for rotatable securing the said spindle to the sleeve.

As shown in the drawing, Fig. 1, there is fitted to the sleeve, at one end, as by being screwed therein and about the telescopic housings 13, a sealing member 14, and at the other end a cap 15. The cap is designed to retain the ball bearing mechanism hereinafter described, which is secured in place by a suitable nut 16 fitting internal threads 17 of the cap. The nut 16 is centrally perforated to permit of the spindle 10 passing freely therethrough. A hub portion 19, shrunk on the spindle 10, has an enlarged portion or flange 20 which is free to rotate in the opening 21 of nut 16 and forms a seat for sets of inner bearing members 22 of the spindle. Lock nuts 23 are secured over the inner and threaded end of the hub and serve to hold the said inner bearing members 22 in position. The latter are of the cup type and consist of two halves, one of which seats upon the flange 20, and the other of which bears against the lock nuts 23. The outer and cooperative bearing member halves 24 are of the cone type and are held between an inner shoulder 25 of the cap 15 and a shoulder 26 of the nut 16. The bearing members for the end of the spindle thus consist of the two sets of inner cup members 22 and outer cone members 24 arranged about the hub 19, and each adapted to retain between them a set of balls 27 which are thus securely held in drawing up the lock nuts 23. Or, bearing members 28 as well as the outer bearing members 24 may be of the cone type, as shown in Fig. 2. When wear becomes considerable, however, the inner of suitable spacing washers 29 may be removed from between the two cup halves 22 and the wear accommodated by drawing up the said lock nuts 23; or, in case no washers were initially used, a washer 29 may be inserted between the two outer members 24, Fig. 2.

As hereinbefore set forth, the inner end cup members 22, or cone members 28, surround and coact with the outer cone members 24 to provide the raceways for the sets of balls 27, the latter members being locked within the cap 15, while the inner members 22 or members 28 are slidable over the hub 19 and rotatable with said spindle, the intervening sets of balls providing a satisfactory bearing for the spindle relatively to the sleeve. The inner members, moreover, afford cup bearings, as shown in Fig. 1, while the outer members are of the cone type, or both members may be of the cone type as shown in Fig. 2, and are so set that the thrusts act in opposite direction, whereby the ball raceways, being more in line with the resultant radial and end thrust, stand up to the wear a greater length of time.

About the spindle 10, furthermore, there may be provided a self-oiling bushing 30 as of wood saturated with oil, said bushing acting also as a steadier for the spindle at high speeds, although it is to be understood that the same is not in the nature of a bearing but has a slight clearance with reference to the spindle. Immediately beneath the bushing and extending substantially to the lock nuts 23, the spindle 10 is surrounded by a series of washers 31 of felt or the like which clear the spindle entirely, being frictionally held in the sleeve and designed to merely act to absorb oil dripping down from the bearing above same. The oil is thus permitted to be slowly distributed thereby into the bearing members 22 and 24.

I claim:

1. In a spindle mounting for drilling machines; a relatively long spindle; a sleeve through which said spindle passes; a bearing at one end of the sleeve for permitting free rotation of the spindle relatively to the sleeve and to confine the former for reciprocating movement with the latter; and a self oiling bushing retained within said sleeve about an appreciable length of the spindle and having a slight clearance with respect thereto to afford a bearing therefor and a means to steady the spindle at high speeds and prevent whipping thereof.

2. A spindle mounting, having in combination; a sleeve, a cap at one end thereof, a spindle passing through said sleeve and cap at one end of the sleeve and having a flange portion freely rotatable within the cap, duplicate ball bearing members retained between said cap and spindle to permit free rotation of the spindle within the sleeve and to confine the former for reciprocating movement with the latter, and a self-oiling bushing retained within said sleeve about a portion of the spindle to steady the latter at high speeds.

3. In a spindle mounting: a spindle, a sleeve through which said spindle passes, a bearing for permitting free rotation of the spindle relatively to the sleeve, a self-oiling bushing retained within said sleeve about a portion of the spindle to steady the latter at high speed, and a plurality of oil absorbent washers retained between said bushing and said bearing.

4. A spindle mounting, having in combination: a sleeve, a cap at one end thereof, a spindle passing through said sleeve and cap and having a flanged portion freely rotatable with the cap, duplicate ball bearing members retained between said cap and spindle, a self-oiling bushing retained within said sleeve, and a plurality of oil absorbent washers between said bearing members and said bushing.

Signed at Glen Rock, in the county of Bergen and State of New Jersey, this 17th day of November, A. D. 1919.

ARTHUR C. MASON.